United States Patent
Tung

(10) Patent No.: US 8,500,273 B2
(45) Date of Patent: Aug. 6, 2013

(54) SOFT CONTACT LENSES FOR TREATING AMETROPIA

(75) Inventor: Hsiao-Ching Tung, South Pasadena, CA (US)

(73) Assignee: Global-OK Vision, Inc., Taipei (TW)

( * ) Notice: Subject to any disclaimer, the term of this patent is extended or adjusted under 35 U.S.C. 154(b) by 0 days.

(21) Appl. No.: 12/476,798

(22) Filed: Jun. 2, 2009

(65) Prior Publication Data

US 2009/0303434 A1 Dec. 10, 2009

Related U.S. Application Data

(60) Provisional application No. 61/059,594, filed on Jun. 6, 2008.

(51) Int. Cl.
*G02C 7/02* (2006.01)
*G02C 7/04* (2006.01)

(52) U.S. Cl.
USPC ............ 351/159.23; 351/159.79; 351/159.78; 351/159.18

(58) Field of Classification Search
USPC ................... 351/160 R, 247, 159.23, 159.18, 351/159.05, 159.79, 159.78
See application file for complete search history.

(56) References Cited

U.S. PATENT DOCUMENTS

| | | |
|---|---|---|
| 4,952,045 A | 8/1990 | Stoyan |
| 5,191,365 A | 3/1993 | Stoyan |
| 5,349,395 A | 9/1994 | Stoyan |
| 5,428,412 A | 6/1995 | Stoyan |
| 5,695,509 A | 12/1997 | El Hage |
| 5,963,297 A | 10/1999 | Reim |
| 6,010,219 A | 1/2000 | Stoyan |
| 6,361,169 B1 | 3/2002 | Tung |
| 6,543,897 B1 | 4/2003 | Tung |
| 6,582,077 B1 * | 6/2003 | Tabb et al. .................... 351/177 |
| 6,652,095 B2 | 11/2003 | Tung |
| 6,997,553 B2 | 2/2006 | Tung |
| 7,025,460 B2 | 4/2006 | Smith et al. |
| 7,070,275 B2 | 7/2006 | Tung |
| 7,360,892 B2 | 4/2008 | Tung |
| 2002/0101563 A1 | 8/2002 | Miyamura et al. |
| 2005/0213030 A1 | 9/2005 | Meyers |
| 2006/0152673 A1 | 7/2006 | Cotie |
| 2006/0152674 A1 | 7/2006 | Berke |
| 2007/0115431 A1 * | 5/2007 | Smith et al. ................... 351/221 |
| 2008/0024717 A1 * | 1/2008 | Kim .......................... 351/160 R |

OTHER PUBLICATIONS

International Search Report for PCT/US2009/046017, Jan. 18, 2010.
Written Opinion of the International Searching Authority for PCT/US2009/046017, Jan. 18, 2010.

(Continued)

*Primary Examiner* — Ricky Mack
*Assistant Examiner* — Zachary Wilkes
(74) *Attorney, Agent, or Firm* — Michael Fedrick; Loza & Loza, LLP

(57) ABSTRACT

A soft contact lens for treating ametropia having an optical zone, a pressure control zone, an alignment zone, and a peripheral zone.

16 Claims, 9 Drawing Sheets

OTHER PUBLICATIONS

Stein, Harold and Slatt, Bernard, "Fitting Guide for Rigid and Soft Contact Lenses, A Practical Approach," Second Ed., The C.V. Mosby Company, pp. 3-6 (1984).

Kastl, Peter, ed., "Contact Lenses, The Clao Guide to Basic Science and Clinical Practice," vol. II, Kendall Hunt Publishing Co., pp. 23-29 (1995).

Fontana, Alfred, "Orthokeratology Using the One Piece Bifocal," International Contact Lens Journal, vol. 16, No. 2, 45-47 (1972).

Swarbrick, Helen et al., "Apical Clearance Rigid Contact Lenses Induce Corneal Steepening," Optometry and Vision Science, 81:427-435 (2004).

Jessen, George, "Orthofocus Techniques," International Contact Lens Journal, vol. 6, 201-204 (1962).

Mandell, Robert, ed., "Contact Lens Practice," Fourth Ed., Charles C. Thomas pub., pp. 173-179 (1988).

Patrick J. Caroline, et al., Contact Lens Spectrum, "Soft Lens Orthokeratoogy", Jun. 2007.

* cited by examiner

SOFT CONTACT LENSES FOR TREATING AMETROPIA

CROSS-REFERENCE TO RELATED APPLICATIONS

The present application claims the benefit of priority from U.S. Provisional Patent Application No. 61/059,594, entitled "SOFT CONTACT LENSES FOR TREATING AMETROPIA" and filed on Jun. 6, 2008, the entire content of which is hereby incorporated by reference in its entirety.

FIELD OF THE INVENTION

The present invention relates to soft contact lenses for use in treating ametropia (refraction errors) such as myopia, hyperopia and astigmatism, and more particularly for use in controlling, slowing the progression of, and/or correcting such vision problems.

BACKGROUND

Many people experience difficulties with their vision. The most common ametropic (refraction error) vision problem is a condition known as myopia or nearsightedness. Myopia is a common condition in which an eye cannot focus on far-away objects because the cornea of the eye is curved too steeply (i.e., the radius of curvature of the cornea is smaller than normal) to provide adequate focusing at the retina of the eye. When the curvature of a cornea is too flat, the eye cannot focus on near objects and the result is hyperopia (farsightedness). Hyperopia is common among young children, and severe hyperopia will induce lazy eye or amblyopia in childhood. Another form of ametropia is astigmatism, in which unequal curvature of one or more refractive surfaces of the cornea prevents light rays from focusing clearly at one point on the retina, resulting in blurred vision.

Myopia, hyperopia, and astigmatism are conditions for which no entirely suitable permanent treatment has been developed. One approach to correcting ametropia is through surgical reshaping of the cornea. However, such surgical procedures have not proven to be entirely safe, and there is some question as to the permanency of the surgically altered corneal shape.

Another approach to treating some or all of these conditions is to alter the corneal shape by wearing hard contact lenses which are designed to continually exert pressure on selected locations of the cornea to gradually force or mold the cornea into the desired corneal curvature. A retainer lens is then worn on a part-time basis to prevent the cornea from returning to its previous shape. This method of treatment is commonly referred to as orthokeratology (also referred to as "ortho-k"). The success of any treatment by orthokeratology is dependent upon the shape and structure of the contact lens.

The overwhelming majority of ortho-k contact lenses are made of rigid gas permeable materials. The rigid materials used in ortho-k, however, can cause discomfort. Efforts to relieve such discomfort have included the addition of soft lens material to the periphery of a lens having a rigid center, resulting in what have been called hybrid lenses. The cost and durability of such lenses, however, have been a concern to practitioners. Some researchers have also tried to reshape the cornea by using an inverted (inside out) soft contact lens, hoping that the inverted front curvature might flatten the cornea for myopia reduction. The results of such use, however, have been unpredictable.

U.S. Pat. No. 5,963,297 to Reim and several patents to Stoyan (U.S. Pat. Nos. 5,349,395; 4,952,045; 5,191,365; and 6,010,219) disclose ortho-k lens designs for myopia reduction. These patents teach lenses having particular lens curvatures for performing orthokeratology.

SUMMARY

There remains a need for better contact lenses for performing orthokeratology to control, slow the progression of, and/or correct ametropia, in particular lenses which are more comfortable and which will thus result in better compliance by users, in particular younger users. The present ortho-k soft contact lenses can provide visual correction and reduction of ametropia, despite being formed from a non-rigid material.

The present ortho-k soft contact lenses for treating ametropia include a central optical zone, a pressure control zone located radially outwardly from the optical zone, and an alignment zone located radially outwardly from the pressure control zone. The optical zone has a back curvature defined by a first optical base curve, a front curvature defined by a first optical front curve, a minimum axial thickness, and a maximum axial thickness; the pressure control zone has a back curvature defined by a pressure control base curve, a front curvature defined by pressure control front curve, a minimum axial thickness, and a maximum axial thickness; and the alignment zone has a back curvature defined by alignment base curve, a front curvature defined by alignment front curve, a minimum axial thickness, and a maximum axial thickness. In the present contact lenses, the minimum axial thickness of the pressure control zone is less than the minimum axial thickness of the optical zone and also less than the minimum axial thickness of the alignment zone, or alternatively the maximum axial thickness of the pressure control zone is greater than the maximum axial thickness of the optical zone and also greater then the maximum axial thickness of the alignment zone. Preferably, a peripheral zone coupled to the alignment zone and extending radially outwardly from the alignment zone is also included.

In one embodiment of the present contact lenses, the minimum axial thickness of the pressure control zone is less than the minimum axial thickness of the optical zone and also less than the minimum axial thickness of the alignment zone. In this embodiment, the minimum axial thickness of the pressure control zone is preferably less than the minimum axial thickness of the optical zone by an amount which is equal to or greater than a predetermined decrease in sagittal height of a subject's cornea. For example, the minimum axial thickness of the pressure control zone can be less than the minimum axial thickness of the optical zone by an amount which is between 10% and 200% greater than the predetermined decrease in sagittal height of a subject's cornea.

The minimum axial thickness of the pressure control zone can also be less than the minimum axial thickness of the alignment zone by an amount which is equal to or greater than a predetermined decrease in sagittal height of a subject's cornea. For example, the minimum axial thickness of the pressure control zone can be less than the minimum axial thickness of the alignment zone by an amount which is between 10% and 200% greater than a predetermined decrease in sagittal height of a subject's cornea.

In this embodiment, if the optical zone comprises two or more division optical zones, the minimum axial thickness of the pressure control zone should thinner than the minimum axial thickness of each of the division optical zones. When the optical zone comprises a first division optical zone adjacent the pressure control zone and a second division optical zone located radially inwardly of the first division optical zone, the radius of curvature of the base curve of the second division optical zone can be shorter than the radius of curvature of the base curve of the first division optical zone, and/or the radius of curvature of the front optical curve of the second division optical zone can be longer than the radius of curvature of the front optical curve of the first division optical zone, such that the division optical zones become thinner radially outwardly. Alternatively or in addition, the back curvatures of the first division optical zone and the second division optical zone can be merged and have one or more positive e-values, and/or the front curvatures of the first division optical zone and the second division optical zone can be merged and have one or more negative e-values, thereby forming a waning optical zone having an aspheric back curvature and/or an aspheric front curvature, such that the waning optical zone becomes thinner radially outwardly. In this embodiment, the back curvature of the waning optical zone and that of the pressure control zone can be merged and have a positive e-value, and/or the front curvature of the waning optical zone and that of the pressure control zone can be merged and have a negative e-value, thereby forming a waning optical-pressure control zone having an aspheric back curvature and/or an aspheric front curvature, such that the waning optical-pressure control zone becomes thinner radially outwardly.

The alignment zone in this embodiment can also comprise two or more division alignment zones, in which case the minimum axial thickness of the pressure control zone is thinner than the minimum axial thickness of each of the division alignment zones. When the alignment zones comprise a first division alignment zone and a second division alignment zone located radially outward of the first division alignment zone, the back curvature of the second division alignment zone can be steeper than the back curvature of the first division alignment zone, and/or the front curvature of the second division alignment zone can be flatter than the front curvature of the first division alignment zone, such that the division alignment zones become thicker radially outwardly. The back curvatures of the first division alignment zone and the second division alignment zone can also be merged and have a negative e-value, and/or the front curvature the first division alignment zone and the second division alignment zones can be merged and have a positive e-value, thereby forming a waxing alignment zone having an aspheric back curvature and/or an aspheric front curvature, such that the waxing alignment zone becomes thicker radially outwardly.

In an alternative embodiment, the maximum axial thickness of the pressure control zone is greater than the maximum axial thickness of the optical zone and also greater than the maximum axial thickness of the alignment zone. In this embodiment, the maximum axial thickness of the pressure control zone is preferably greater than the maximum axial thickness of the optical zone by an amount which is equal to or greater than a predetermined increase in sagittal height of a subject's cornea. The maximum axial thickness of the pressure control zone can be greater than the maximum axial thickness of the optical zone, for example, by an amount which is between 10% and 200% greater than a predetermined increase in sagittal height of a subject's cornea. The maximum axial thickness of the pressure control zone can also be greater than the maximum axial thickness of the alignment zone by an amount which is equal to or greater than a predetermined increase in sagittal height of a subject's cornea, for example by an amount which is between 10% and 200% greater than a predetermined increase in sagittal height of a subject's cornea.

In this embodiment, the optical zone can comprise two or more division optical zones, in which case the maximum axial thickness of the pressure control zone is greater than the maximum axial thickness of each of the division optical zones. When the optical zone comprises a first division optical zone adjacent the pressure control zone and a second division optical zone located radially inward of the first division optical zone, the back curvature of the second division optical zone can be flatter than the back curvature of the first division optical zone, and/or the front curvature of the second division optical zone can be steeper than the front curvature of the first division optical zone, such that the division optical zones become thicker radially outwardly.

The alignment zone in this embodiment can also comprise two or more division alignment zones, in which case the maximum axial thickness of the pressure control zone is thicker than the maximum axial thickness of each of the division alignment zones. When the alignment zone comprises a first division alignment zone, and a second division alignment zone located radially outward of the first division alignment zone, the back curvature of the second division alignment zone can be flatter than the back curvature of the first division alignment zone, and/or the front curvature of the second division alignment zone can be steeper than the front curvature of the first alignment zone, such that the division alignment zones become thinner radially outwardly. The back curvatures of the division alignment zones can also be merged and have a positive e-value, and/or the front curvatures of the division alignment zones can be merged and have a negative e-value, thereby forming a waning alignment zone having an aspheric back and/or an aspheric front curvature, such that the waning alignment zone becomes thinner radially outwardly. The back curvatures of the optical zone and the pressure control zone can also be merged and have a negative e-value, and/or the front curvatures of the optical zone and the pressure control zone can be merged and have a positive e-value, thereby forming a waxing optical-pressure control zone having an aspheric back curvature and/or an aspheric front curvature, such that the waxing optical-pres sure control zone becomes thicker radially outwardly. In addition, the back curvatures of the waxing optical-pressure control zone and the back curvature of the alignment zone can be merged with one or more negative e-values and then merged with one or more positive e-values radially outwardly, and/or the front curvatures of the waxing optical-pressure control zone and the alignment zone can be merged with one more positive e-values and then merged with one or more negative e-values radially outwardly, thereby forming a waxing and then waning optical-pressure control-alignment zone having an aspheric back curvature or aspheric front curvature, such that the optical-pressure control-alignment zone becomes thicker and then thinner radially outwardly.

The present contact lenses can be used in the treatment of ametropia, including hyperopia, myopia, and astigmatism. Following an eye examination by a practitioner in order to determine the type and degree of ametropia experienced by a subject's eye or eyes, soft contact lenses having the appropriate front and back curvatures and/or thicknesses are identified or designed for use by the subject. An appropriate lens or lenses is then provided and placed in contact with the cornea of the subject, and the lenses are worn for an appropriate period of time, generally for at least six hours per day, more preferably for between 8 and 12 hours per day or more, for at least 14 days.

DESCRIPTION

Definitions

Figure 1:
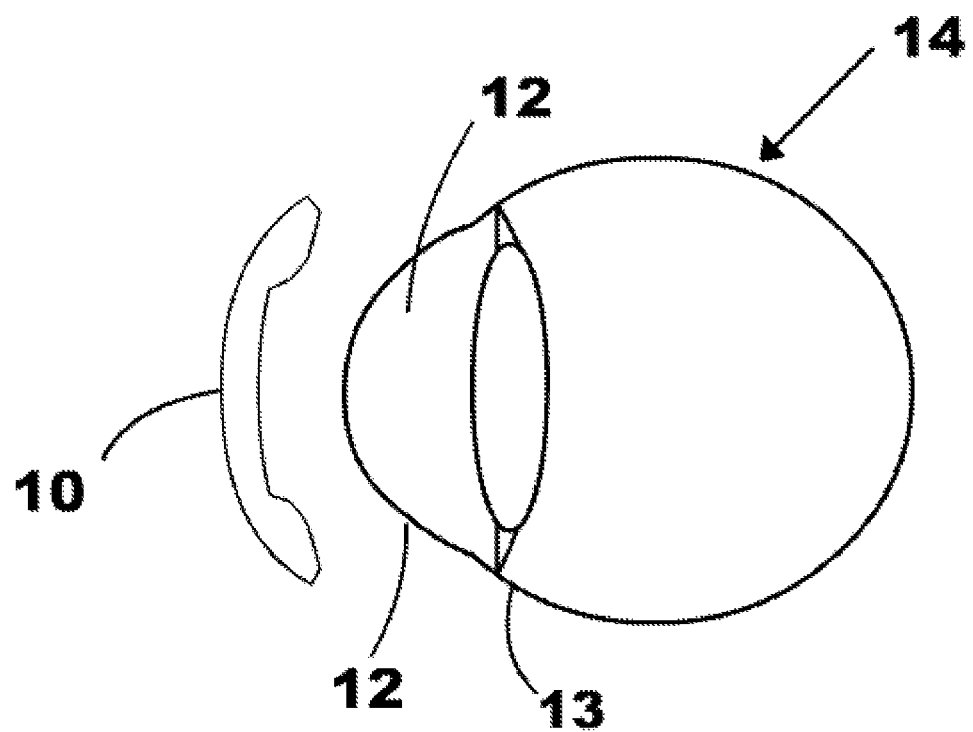
FIG. 1 is a side schematic view of an ortho-k soft contact lens according to the present invention positioned adjacent to the cornea of a patient's eye.

As used herein, the following terms and variations thereof have the meanings given below, unless a different meaning is clearly intended by the context in which such term is used.

"Ametropia" refers to a refractive error in a subject's vision, i.e. an error in the focusing of light by the eye resulting in changed or reduced visual acuity. Examples of ametropia include myopia, hyperopia, and astigmatism.

The "axial thickness" of a contact lens at a certain point radially outward from the geometric center of a contact lens means the axial distance between the front and back surfaces of the lens at that point of the contact lens 10, which can be determined by subtracting the sagittal height of the front surface from the sagittal height of the back surface at that point, and then adding the center thickness of the contact lens to that amount. The front sagittal height of a lens at certain point means the vertical distance measured from the front surface at that point to the horizontal plane intersecting the most peripheral margin of the front surface of a lens. The back sagittal height of a lens at certain point means the vertical distance measured from the back surface at that point to the horizontal plane intersecting the most peripheral margin of the back surface of the lens.

"Back curvature" refers to a curvature of a back (rear) surface of a contact lens, i.e. the surface which contacts the eye of a subject. "Front curvature" refers to a curvature of a front surface of a contact lens, i.e. the surface which faces away from the eye of a subject.

"Base curve" means a curve on the back (rear) surface of a contact lens.

The "center thickness" is the distance between the front and back surfaces of a contact lens at the geometric center of the contact lens.

"E-value" refers to a measure of corneal eccentricity, with a value of zero indicating a perfectly spherical cornea. A negative e-value indicates a flat central zone with a steep mid-periphery (oblate surface), while a positive e-value indications a cornea that is steep centrally and flattens peripherally (prolate surface).

"Front curve" means a curve on the front surface of a contact lens.

"Orthokeratology" and "ortho-k" refer to the planned application of a series of one or more contact lenses to improve vision through the reshaping of the cornea.

A "rigid contact lens" is one whose surface does not change shape so as to assume the contour of a corneal surface. Rigid lenses are typically made from PMMA [poly(methyl methacrylate)] or from gas-permeable materials such as silicone acrylates, fluoro/silicone acrylates, and cellulose acetate butyrate, whose main polymer molecules generally do not absorb or attract water.

A "soft contact lens" is one that is formed from a material whose surface generally assumes the contour of a corneal surface when placed onto a cornea. Soft contact lenses are typically made from materials such as HEMA (hydroxyethylmethacrylate) or silicone hydrogel polymers, which contain about 20-70% water.

The "thickness drop" between two adjacent zones refers to the difference in axial thickness by comparison of the thickest portion of the thicker zone with the thinnest portion of the thinner zone of the contact lens. A zone is said to be the thinnest, the thickest, thinner than, or thicker than other zone(s) by comparison of the portion of a zone which is thinnest (having the least axial thickness) or thickest (having the greatest axial thickness), as the case may be, with the thinnest or thickest portion of a zone with which it is being compared.

A "zone" is a partially or completely circumferential region of a contact lens. In the present lenses, zones typically have a maximum or minimum axial thickness which is different from that of an adjacent circumferential region of the lens. Typically, a zone will also have a back surface that comprises a base curve with a particular radius of curvature, with or without an e-value. However, a zone can also comprise a plurality of curvatures having a particular e-value or forming one or more defined curvatures such as an aspheric curve or S curve.

As used herein, the term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise.

Contact Lenses

FIGS. 1-5 illustrate ortho-k contact lenses 10 according to the present invention. As shown in FIG. 1, the contact lens 10 is a pressure control soft contact lens that is adapted to be worn over the cornea 12 of a patient's eye 14. As shown in FIGS. 2-5, the present contact lens 10 typically has four correction zones, listed from the center of the lens 10 to the outer periphery: an optical zone 20, a pressure control zone 22, an alignment zone 26, and a peripheral zone 28.

The present soft contact lens 10 is pliable and conforms to the contour of a cornea 12, particularly when the central thickness of the contact lens is relatively thin. A soft spherical contact lens 10 does not tend to form a lacrimal lens on the back surface of the contact lens 10, and the contour, the curvatures and the toricity of the cornea 12 are transferred to the back surface of the soft contact lens 10 and then conveyed to the front surface of the contact lens 10. By contrast, a rigid spherical contact lens can neutralize most of the corneal toricity and part of the refractive error without reflecting the power onto the front surface (power surface) of the contact lens. Thus, corneal reshaping by rigid contact lenses, including but not limited to the hydraulic massage and compression forces exerted by the optical zone and alignment zone of a rigid contact lens, is accomplished differently than in the present method for ortho-k using a soft contact lens 10.

While a soft contact lens 10 transfers the contour of the cornea 12 to the back surface, then to the front surface of the contact lens 10, force can also be applied in the opposite direction, i.e. from the eyelid to the front surface of the soft contact lens 10 and then to the back surface of the contact lens 10, and such force can ultimately be applied to the cornea 12.

Hence, the front surface and the back surface of the soft contact lens 10, covering the same geometric site of the cornea 12, can be considered to function as a unit, such that any curvature or thickness changes made on either side will be transferred and reflected onto the corresponding area of the cornea 12 for ortho-k or corneal reshaping.

A rigid ortho-k lens transfers the lid pressure to the surface of a cornea 12 by consecutive contact or non-contact zones, via the rigidity of the material itself, to exert positive or negative pressure on areas of cornea 12 to alter the corneal shapes accordingly. As aforementioned, current soft contact lenses are pliable and conform to the corneal surface, from center to periphery, via which the lid pressure is uniformly transferred to the entire cornea, and no alternate "positive and negative" forces are generated by such lenses for conducting ortho-k or corneal reshaping. A soft contact lens 10 can, however, generate relatively positive or negative forces by creating thickness differences in the soft contact lens material instead of curvature differences, to simulate the relative pressure of a rigid ortho-k contact lens for each zone of the lens. The relative thicknesses and/or curvatures of different zones of the soft contact lens will transfer lid pressure, in a form of relatively positive or negative forces, backward to the front surface of the cornea 12 for corneal reshaping. A thinner zone applies relatively "negative force," i.e. less force than a thicker zone, while a thicker zone exerts "positive force," which is similar to what a rigid ortho-k contact lens can do with steeper or flatter zones on the back surface of a rigid contact lens, to reshape a cornea 12.

The present lenses preferably have a hardness similar to that of current soft contact lenses, such as those made from Lotrafilcon A (a fluoroether-based silicone hydrogel), Balafilcon A, Lotrafilcon B, Comfilcon A, Senofilcon A, pHEMA (polyhydroxyethylmethacrylate), Omafilcon A, and Galyfilcon A. Lenses having a hardness which is greater than that of such soft lenses can also be used, as long as the rear surface of the lens generally assumes the contour of a corneal surface when placed onto a cornea.

The hardness of the present lenses is preferably measured using a hardness test such as the Shore® (Durometer) test or Rockwell hardness test. Both methods measure the resistance of plastics toward indentation. In the Shore test, hardness is determined by the penetration of the foot of the indenter apparatus (preferably a Zwick Durometer Hardness Tester, available from Zwick USA, 1620 Cobb International Blvd., Suite 1, Kennesaw, Ga., U.S.) into a sample. When the Shore hardness test is used, either the Shore A or Shore D scales are preferably employed, as these scales are designed to measure the hardness of elastomers.

When measuring hardness, a specimen to be tested is first placed on a hard flat surface. The indentor for the instrument is then pressed into the specimen making sure that it is parallel to the surface. The hardness is preferably read within one second of contact with the specimen. Preferably, ASTM test method ASTM D2240 is used to determine hardness.

The present lenses also preferably have an elasticity similar to that of current soft contact lens materials such as Lotrafilcon A, Balafilcon A, Lotrafilcon B, Comfilcon A, Senofilcon A, pHEMA, Omafilcon A, and Galyfilcon A. These materials have a modulus of elasticity of between about 0.4 MPa and 1.5 MPa. By contrast, hard contact lens materials such as PMMA have an elasticity of about 2,000 MPa.

Preferably, the present lenses have a hardness and/or an elasticity which is no more than 20% that of PMMA rigid contact lenses, more preferably a hardness and/or an elasticity of between 0.0005% and 5% of PMMA rigid contact lenses, and even more preferably between 0.001% and 1%. The present lenses also preferably have a hardness and/or an elasticity which is less than about 200% that of current soft contact lenses, more preferably within about 50% of the hardness and/or an elasticity of current soft lenses.

The present lenses are also preferably hydrophilic, and can have a water content, e.g., of between about 20% and 50%. The lens material should have an oxygen permeability, which is advisable for the wearing schedule of a subject wearing the present lenses. The soft lens material can be a hydrogel or silicone hydrogel for higher oxygen permeability.

The hardness and elasticity of the present soft contact lenses should be measured when the lenses are in the condition in which they are to be worn by subjects. For hydrophilic lenses, therefore, hardness and elasticity should be measured only after such lenses are fully hydrated, i.e. saturated with water, such as by soaking such lenses in an aqueous solution for 12 hours, preferably in a solution having a salinity of 9 parts per thousand.

The curvatures described herein for the present ortho-k soft contact lenses should also be measured in the condition in which they are to be worn by subjects, which for hydrophilic lenses is in the hydrated state. For such lenses, the curvature of a lens after hydration can be estimated or derived from the curvature of the lens in the dry state by measuring the dry curvature and then multiplying the curvature by an appropriate expansion factor. Expansion factors are specific for each material, and are known to the art. The curvature of a hydrophilic lens after hydration is increased (elongated) linearly by the expansion factor as compared to the curvature of the dry lens.

The present contact lenses can be produced in ways known to the art, such as by lathe cutting, spin casting, and mold casting, in which case the dimensions of the dry lens produced by such methods are based on the expansion factor of the material being used. Soft molding of lenses, such as hydrophilic lenses, can also be employed, for example by molding a polymer material in a glass mold in a fully or partially hydrated state.

Optical Zone 20

The optical zone 20 has a back surface that is defined by the base curve 30, and a front surface that is defined by the front optical curve 31. The base curve of a conventional soft contact lens is usually designed to be much flatter than the measured curvature of a central portion of the cornea 12, which enables the contact lens to rest on the central portion of the cornea 12 as well as to extend 1-2 millimeters (mm) beyond the corneal margin or limbus to rest on the sclera 13 portion of the eye peripherally. A conventional soft contact lens does not contact to the peripheral portion of the cornea 12 but instead contacts the sclera shell beyond the limbus for getting peripheral support. This is referred to as the three points touch method for soft contact lens fitting.

In the present soft contact lens 10, the radius of curvature of the base curve 30 can be longer (flatter), equal to, or shorter (steeper) than a measured curvature of a central portion of the cornea 12 based upon what kind of ametropia is to be targeted. In one embodiment, the optical zone 20 can be divided into two or more consecutive optical zones, namely optical zones 201, 202, and 203 having base curves 301, 302, and 303, respectively, with progressively steeper (shorter) or flatter (longer) radii of curvature for a gradually increased (waxed) or decreased (waned) axial thickness radially outward. The optical zone 20 connects to a pressure control zone 22, which has an increased or decreased thickness in order to exert relatively positive or negative compression forces on cornea 12.

The multiple optical zones, 201, 202, and 203, can also be substituted by an aspheric curvature, with a negative eccentricity (e) value for progressively steeper or a positive eccentricity (e) value for progressively flatter curvatures, with the waxed and waned effect on the axial thickness, connecting radially outwardly to the pressure control zone 22. A soft contact lens 10 is pliable as aforementioned, and will conform to the corneal surface so that the front optical curve 31 as well as the base curve 30 are both effective in forming a desired axial thickness for optical zone 20 and its division zones 201, 202, and 203. The formation of waxed or waned axial thickness in the optical zone 20 can be accomplished in ways known in the art. For example, a waned thickness extending radially outward can be formed by providing a progressively flatter back curve 30 or a progressively steeper front curve 31 (or by incorporating both front and back curves). A progressively flatter back curve will have a positive e value, while a progressively steeper front curve will have a negative e-value. A waxed thickness is formed in the opposite manner.

The corneal sagittal height on the central portion of cornea 12 decreases with myopia molding and with the flattening of the central portion of the cornea. Corneal sagittal height for hyperopia molding will increase with the steepening of the central portion of the cornea. The required thickness drop or difference between the central portion of optical zone 20 and the next pressure control zone 22 can be estimated by the required sagittal height difference of the cornea 12, before and after molding for reduction of ametropia. The thickness drop difference is preferably about 10%-200% higher than the corneal sagittal height difference to ensure proper reduction of the ametropia. The sagittal height calculation formula is well known to those of skill in the art of ortho-k or refractive surgery treatment. For a cornea zone with a zone width of 2d, sagittal height=$Sqrt(R_0^2+d^2e^2)-sqrt((Sqrt(R_0^2+d^2e^2))^2-d^2)$, where the cornea e value=e and the central cornea curvature=$R_0$.

For example, a cornea originally having a central curvature $R_0$=43 diopter or 7.85 mm in radius and a cornea e value (e)=0.4, in which the target power is 1 Diopter of myopia, the central corneal curvature should be flattened to 42 diopters or 8.04 mm in radius. The targeted zone width (2d) after flattening is 6 mm in diameter. Using the sagittal height formula:
 (a) the sagittal height for central 6 mm of 43 D original cornea is 0.589 mm;
 (b) the sagittal height for central 6 mm of 42 D cornea after molding is 0.574 mm; and
 (c) the sagittal height difference required for reduction of 1 D myopia is (a)–(b)=0.015 mm.

In this example, the thinnest axial thickness for the pressure control zone 22 should be at least 0.015 mm thinner than that of the geometric center of the optical zone 20 (over-target thickness drops can also be used). The thickness difference between pressure control zone 22 and the alignment zone 26 can also contribute to soft contact lens ortho-k and enhance corneal molding.

Figure 4:
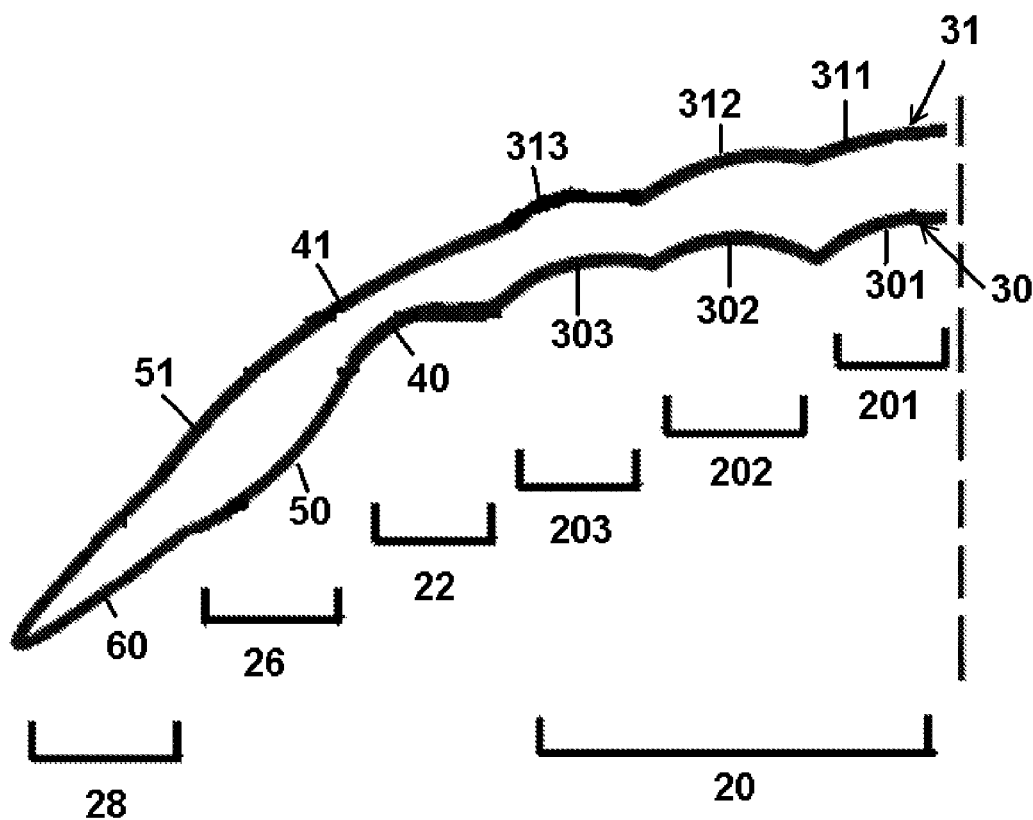
FIG. 4 is a partial sectional view of an ortho-k soft contact lens for myopia reduction along line 4-4 of FIG. 5.
Figure 5:
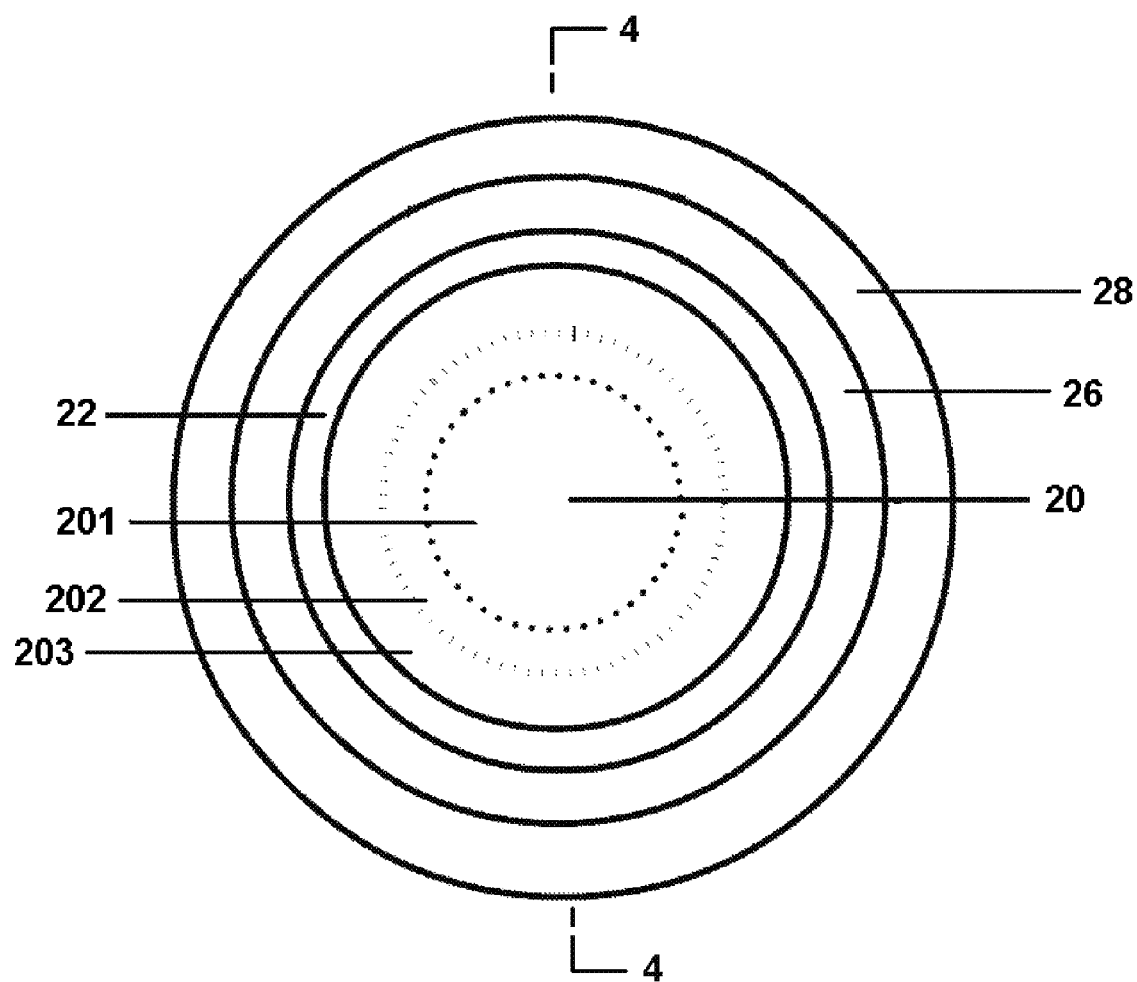
FIG. 5 is a top planar view of the ortho-k soft contact lens of FIGS. 4, 4A, and 4B.

The central curvature of front optical curve 31 can be properly determined by those of skill in the art for far vision so that the lens can be used for night or daywear. A conventional soft contact lens for myopia correction is thinnest at its center and thickest at its edge in order to form a concave lens. As shown in FIGS. 4 and 5, for myopia ortho-k, the axial thickness of optical zone 20 of the soft contact lens 10 is preferably thickest at the geometric center and becomes thinner toward the edge of optical zone 20, connecting to the pressure control zone 22 where the axial thickness becomes thinnest for exerting a "negative force" on the mid-peripheral portion of cornea 12. The thicker central zone of contact lens 10 can exert a positive force on central portion of the cornea 12 for flattening of the curvature. The thinner edge of optical zone 20 and pressure control zone 22 exerts a negative force on the midperipheral portion of the cornea 12, which in turn steepens the midperipheral portion of the cornea 12 for myopia reduction.

The present soft contact lens thus differs from the prior art use of an inverted soft contact lens for myopia reduction in that the axial thickness of the inverted lens was thinnest at its geometric center and became thicker radially outwardly to a point approaching or beyond the periphery of the cornea. The central compression force created by such an inverted lens is thus quite limited and unpredictable, unlike the force created by the present lenses.

The front optical curve 31 can be divided into two or more concentric zones with front curves 311, 312, and 313 that have progressively steeper (shorter) front radii for each division optical zone 201, 202, and 203 of optical zone 20. This makes the axial thickness of the optical zone 20 thickest at the center and thinnest at the outer edge of the optical zone 20, yet preserves the central lens power for daywear.

The back surface of the optical zone 20 and its base curve 30 can also be divided into two or more concentric zones having back curves 301, 302, and 303 with progressively flatter (longer) radii for each division optical zone 201, 202, and 203 of optical zone 20. This also makes the lens thickest at the center and thinnest at the outer edge of the optical zone 20 yet preserves the central lens power for daywear.

Alternatively, by incorporating a positive e (eccentricity) value for the base curve 30 or a negative e (eccentricity) value for the front optical curve 31, the geometric center of the contact lens 10 can also be made to be the thickest portion and the outer edge of the optical zone 20 the thinnest, while keeping the central power unchanged for far vision.

Figure 2:
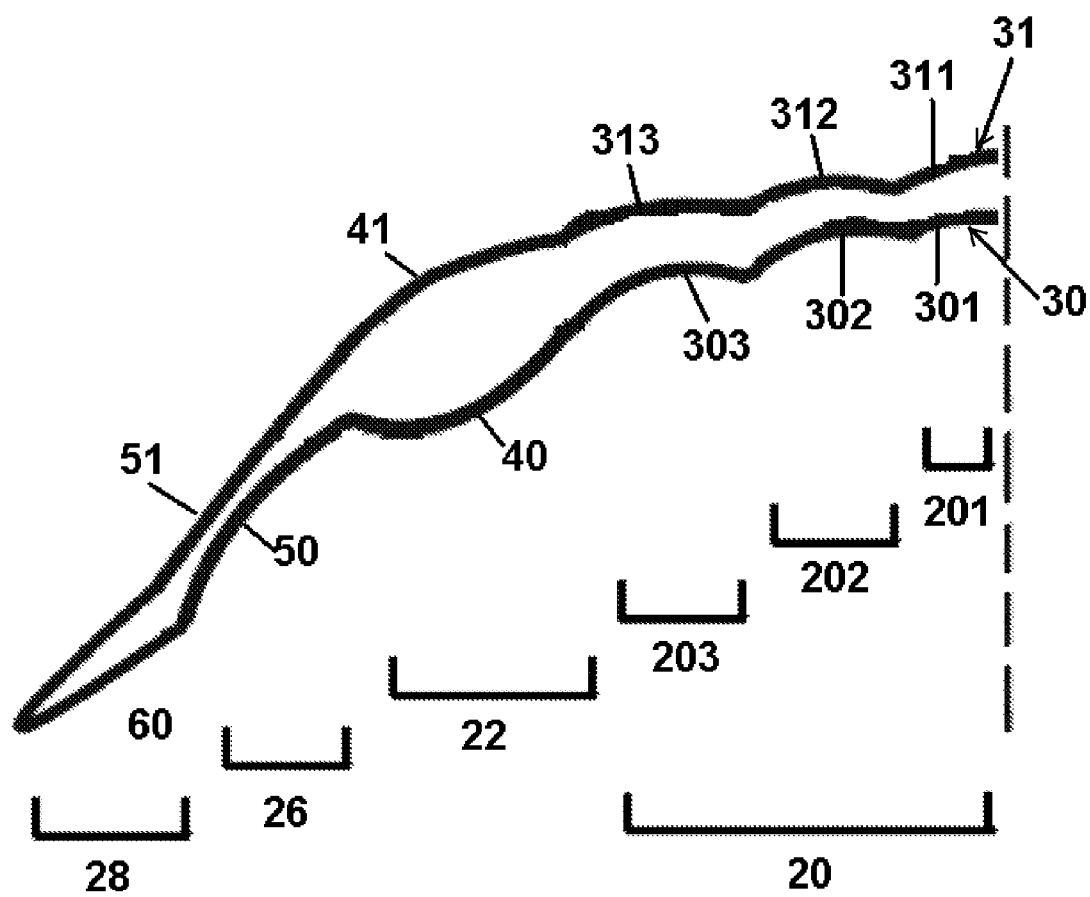
FIG. 2 is a partial sectional view of an ortho-k soft contact lens for hyperopia reduction along line 2-2 of FIG. 3.
Figure 3:
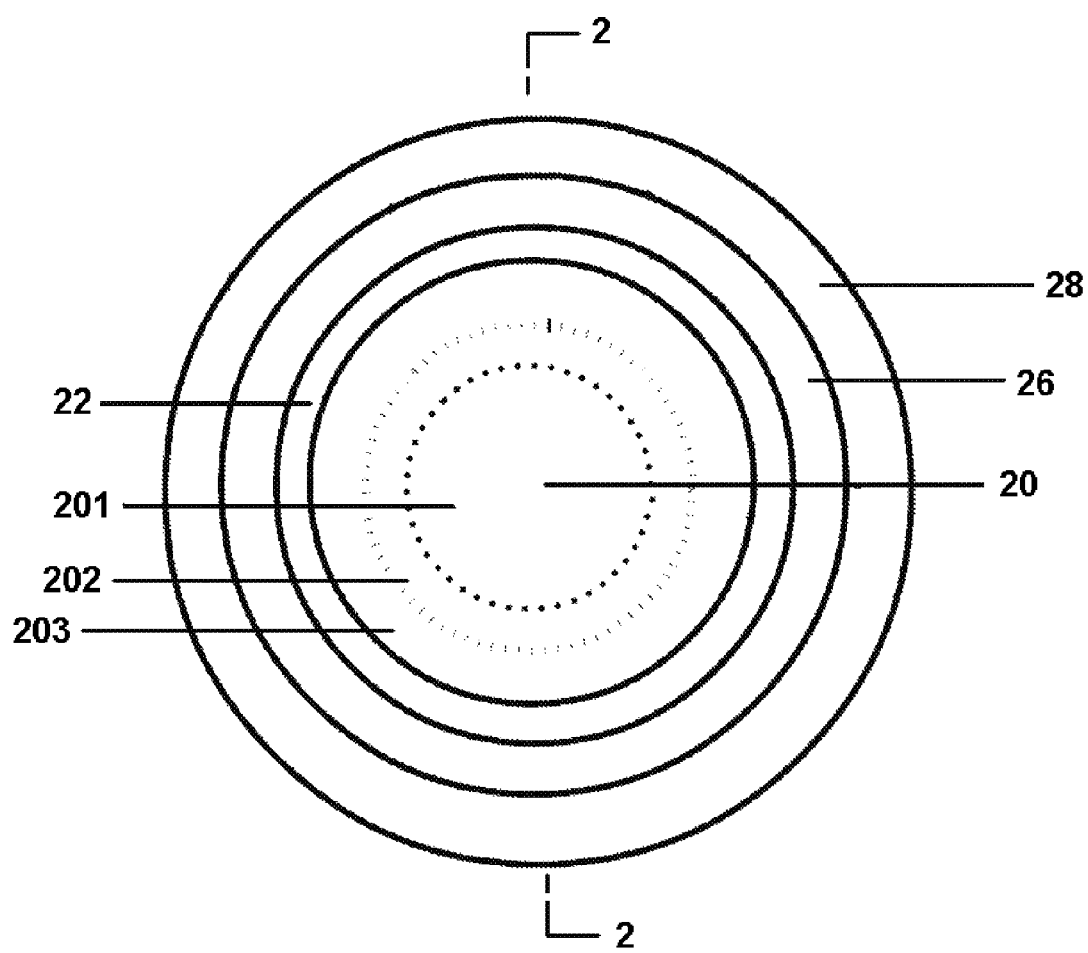
FIG. 3 is a top planar view of the ortho-k soft contact lens of FIGS. 2, 2A, and 2B.

A conventional soft contact lens for hyperopia correction is thickest at its center and thinnest at its edge to form a convex lens for hyperopia correction. As shown in FIGS. 2 and 3, for hyperopia ortho-k, the axial thickness of optical zone 20 of the soft contact lens 10 is thinnest at the geometric center and preferably become progressively thicker toward the edge of optical zone 20, connecting to the pressure control zone 22 where the axial thickness becomes thickest in order to exert a "positive force" on the mid-peripheral portion of cornea 12. The thinner central zone of contact lens 10 can exert negative force on the central portion of the cornea 12 for steepening of the curvature. The thicker edge of optical zone 20 and pressure control zone 22 can exert positive force on the midperipheral portion of the cornea 12, which in turn flattens the midperipheral portion of the cornea 12 for hyperopia reduction.

The front optical curve 31 can be divided into two or more concentric zones with front curves 311, 312, and 313 having progressively flatter (longer) radii for each division of optical zones 201, 202, and 203 of optical zone 20. This makes the axial thickness thickest at outer edge and thinnest at center of the optical zone 20 while preserving the central lens power for daywear.

The back surface of optical zone 20 and its base curve 30 can also be divided into two or more concentric zones having back curves 301, 302, and 303 with progressively steeper (shorter) radii for each division of optical zones 201, 202, and 203 of optical zone 20, which in turn makes the lens thinnest at its center and thickest at the outer edge of the optical zone 20 while preserving the central lens power for daywear.

Alternatively, by incorporating a negative e (eccentricity) value for the base curve 30 or a positive e (eccentricity) value for the front optical curve 31, the geometric center of the contact lens 10 can be made the thinnest portion and the outer edge of the optical zone 20 the thickest while keeping the central power unchanged for far vision.

The relative thickness of the geometric center of the contact lens 10 versus the pressure control zone 22 is believed to be important for ortho-k or corneal reshaping using the present soft contact lenses. Blending the junction between the thick and thin zone, which is demonstrated herein by an aspheric curve or multiple progressively flattened or steepened curvatures, is also believed to contribute to the effectiveness of the present lenses. It is also possible to blend or smooth out the junction with other available curves including but not limited to a convex surface.

In one embodiment, the diameter of the optical zone 20 ranges from 3 mm to 10 mm, and the diameters of each of the division optical zones 201, 202, 203 range from 1 mm to 9.5 mm. The radii of curvature for the base curve 30 and the front optical curves 31 as well as their division curvatures 301, 302, 303, 311, 312, and 313 range from 15.0 mm to 5.0 mm. The thickness of the optical zone 20 and its division optical zones 201, 202, 203 after hydration ranges from 0.01 mm to 1.5 mm.

Pressure Control Zone

The pressure control zone 22 is believed to control whether a positive or negative pressure is exerted on a cornea by the present contact lens 10. The pressure control zone 22 has a radius of back curvature defined by pressure control curve 40 and a radius of front curvature defined by front pressure control curve 41, with the radius of curvature determined to form a proper thickness for exerting positive or negative pressure on cornea 12. The axial thickness of the pressure control zone 22 determines a positive or negative pressure type for itself and also alters the adjacent zones, the optical zone 20 and alignment zone 26, into a reversed pressure type for corneal molding. Hence, with the pressure control zone 22, the pressures radially outward from the geometric center of the contact lens 10 will become positive (for optical zone 20), negative (for pressure control zone 22) and then positive (for alignment zone 26) for myopia ortho-k. For hyperopia ortho-k, the pressures radially outward from the geometric center of the contact lens 10 will become negative (for optical zone 20), positive (for pressure control zone 22) and then negative (for alignment zone 26).

Figure 2A:
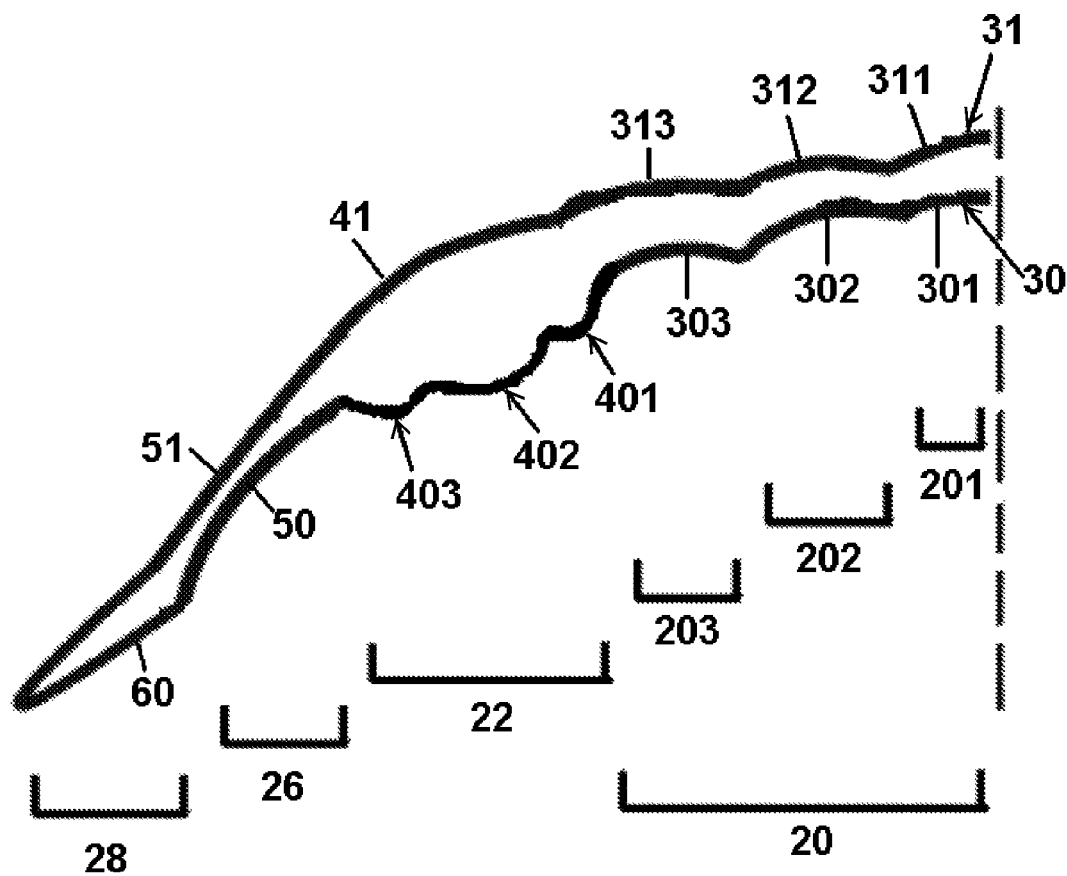
FIG. 2A is a partial sectional view of another ortho-k soft contact lens for hyperopia reduction.

For pressure control zone 22 to exert positive pressure on cornea 12 for hyperopia ortho-k, as shown in FIGS. 2 and 3, the curvature is set to form a thicker axial thickness than its adjacent optical zone 20 and alignment zone 26, such that both adjacent zones will be exerting a negative force on corresponding surface areas of cornea 12. At a minimum, the thickest portion of the pressure control zone 22 should be thicker than the thickest points of the optical zone 20 and the alignment zone 26 (with the reverse being the case when the pressure control zone 22 is adapted to exert negative pressure on a cornea 12 for myopia ortho-K). A back pressure control curve 40 much steeper than base curve 30 is created, or a front pressure control curve 41 flatter than front optical curve 31 is created, in order to achieve a thicker axial thickness for the pressure control zone 22. As shown in FIG. 2A, pressure control zone 22 can also be divided into multiple division zones 401, 402, and 403 such that the middle division zone of pressure control zone 22 forms or comprises the thickest portion and the consecutive division zones gradually thin inwardly as well as outwardly connecting to the adjacent zones (optical zone 20 and alignment zone 26).

Alternatively, the pressure control zone 22 and its multiple division zones can be smoothed out by a positive e value for the back pressure control curve 40 or a negative e value for the front pressure control curve 41. The aspheric curvatures 40 and 41 can also merge, radially inwardly, with an aspheric base curve 30 or front optical curve 31 respectively as aforementioned or radially outwardly with the back or front surface of alignment zone 26 to form a single aspheric curvature with a plurality of e values. It is also possible to blend or merge the junctions with other available curves including but not limited to a convex surface.

Figure 4A:
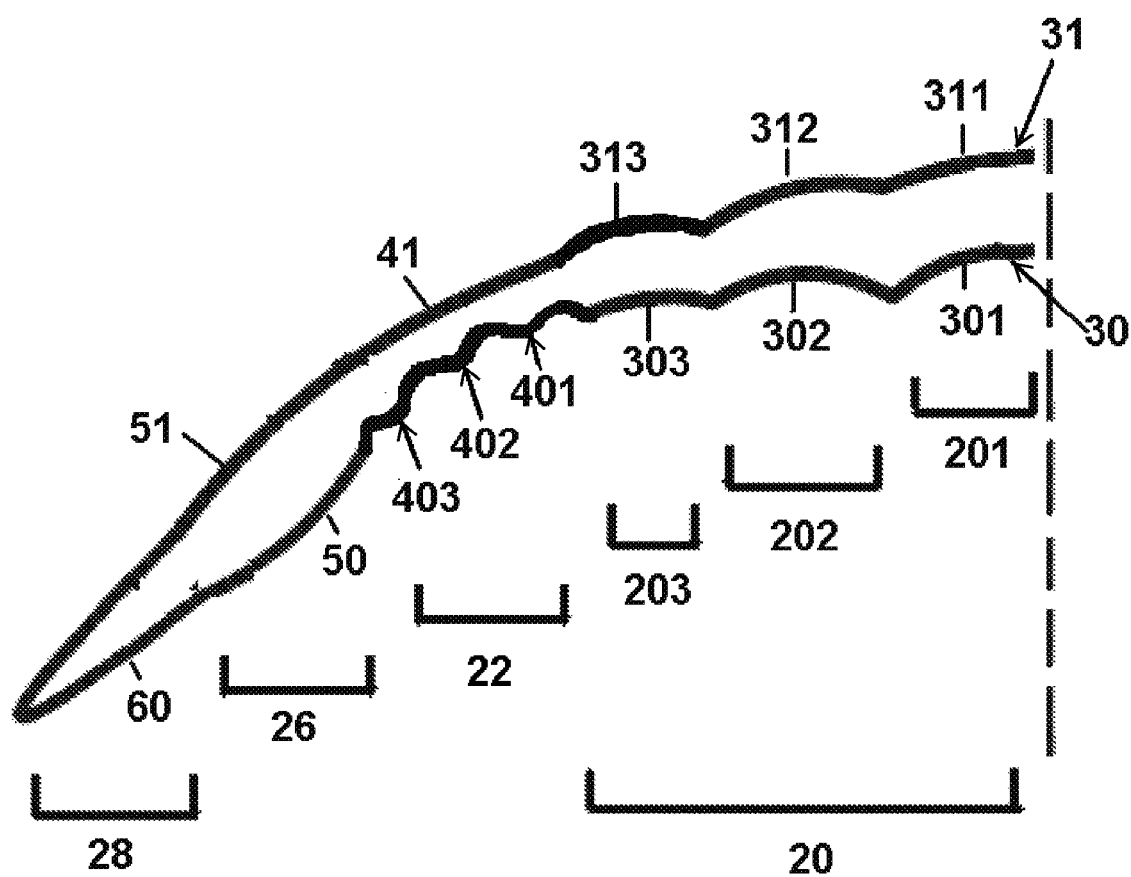
FIG. 4A is a partial sectional view of another ortho-k soft contact lens for myopia reduction.

For pressure control zone 22 to exert negative pressure on cornea 12 for myopia ortho-k, the curvature is set to form a thinner axial thickness than the adjacent optical zone 20 and alignment zone 26, as shown in FIGS. 4 and 5, such that both adjacent zones will be exerting a positive force on corresponding surface areas of cornea 12. A rear pressure control curve 40 can be created which is much flatter than base curve 30, or a front pressure control curve 41 steeper than front optical curve 31 can be utilized to achieve a thinner axial thickness for the pressure control zone 22. As shown in FIG. 4A, pressure control zone 22 can also be divided into multiple zones 401, 402, and 403, and the front or back curvatures of the middle division pressure control zone can form or comprise the thinnest portion while the consecutive division zones gradually thicken inwardly as well as outwardly toward the adjacent zones (optical zone 20 and alignment zone 26).

Alternatively, the pressure control zone 22 and its multiple division zones can be smoothed out by a negative e value for the back pressure control curve 40 or a positive e value for the front pressure control curve 41. The aspheric curvatures 40 and 41 can also merge, radially inwardly, with an aspheric base curve 30 or front optical curve 31 respectively as aforementioned or radially outwardly with the back or front surface of alignment zone 26 to form a single aspheric curvature with plurality of e values. It is also possible to blend or merge the junctions with other available curves including but not limited to a convex surface.

Although the foregoing model for forming a desired axial thickness for pressure control zone 22 is by creating multiple pressure control zones and/or aspheric pressure control curvatures for the back and/or front surface of the pressure control zone 22, it is also possible to achieve the same results by other methods, such as by removing plastic material from an annular zone for a thinner zone or adding more material to the annular zone to make the pressure control zone 22 thicker. In one embodiment, the width of the pressure control zone 22 ranges from 0.1 mm to 5.0 mm (depending on the shape of the cornea 12, the targeted power, and kind of ametropia for reduction), the radius of curvature for the pressure control curve 40 and the front pressure control curve 41 is 1-20 diopters steeper or flatter than the base curve 30, and the thickness drop between the pressure control zone 22 and optical zone 20 is about 0.03 mm to 1 mm thicker or thinner to each other according to the extent and kind of ametropia which is to be treated.

Alignment Zone 26

A conventional soft contact lens rests on the sclera portion of the eye, 1-2 mm out of the limbus, rather than on the peripheral cornea, and matches its sagittal height counting up to the sclera portion of an eyeball where it rests. The alignment zone 26 of the present contact lens 10 is designed to provide peripheral compression and maintain centration of the lens 10 by having a radius of back curvature, the alignment curve 50, and a front radius of curvature, the front alignment curve 51, which operate to exert a positive or negative force on the cornea, in particular the midperipheral portion of the cornea. The concept of having an alignment zone that rests on the peripheral portion of the cornea and that assists in compressing the cornea is a new concept for a soft contact lens.

The sagittal height of the present soft contact lens 10 should be determined from measured corneal data so that the alignment zone 26 of the contact lens 10 rests on the peripheral portion of the cornea 12, and so that the axial elevation (AEL) of the back surface of the alignment zone 26 approximately matches the AEL of the front surface of cornea 12. The thickness factor of the alignment zone should also be considered along with the curvature calculation to form relatively thicker or thinner zones required for generating a positive or negative pressure force according to the type of ametropia being targeted.

Figure 2B:
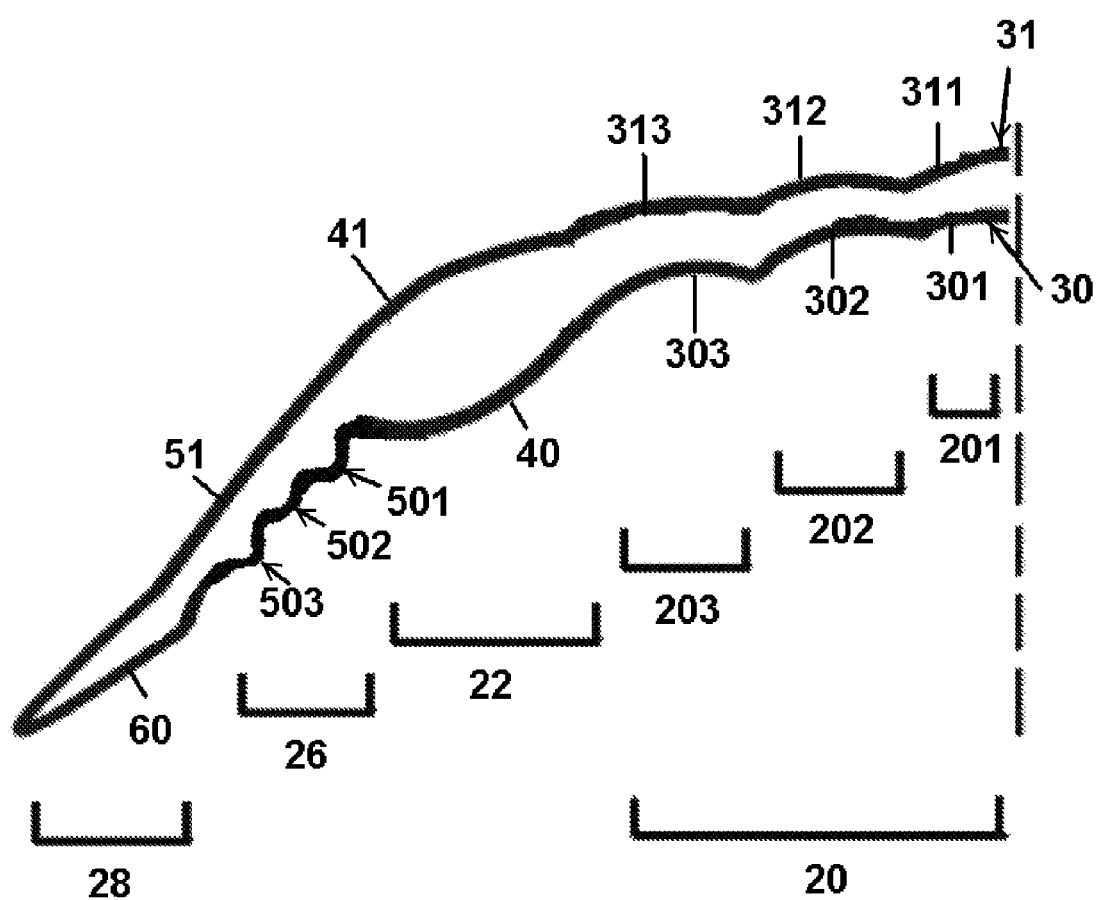
FIG. 2B is a partial sectional view of yet another ortho-k soft contact lens for hyperopia reduction.
Figure 4B:
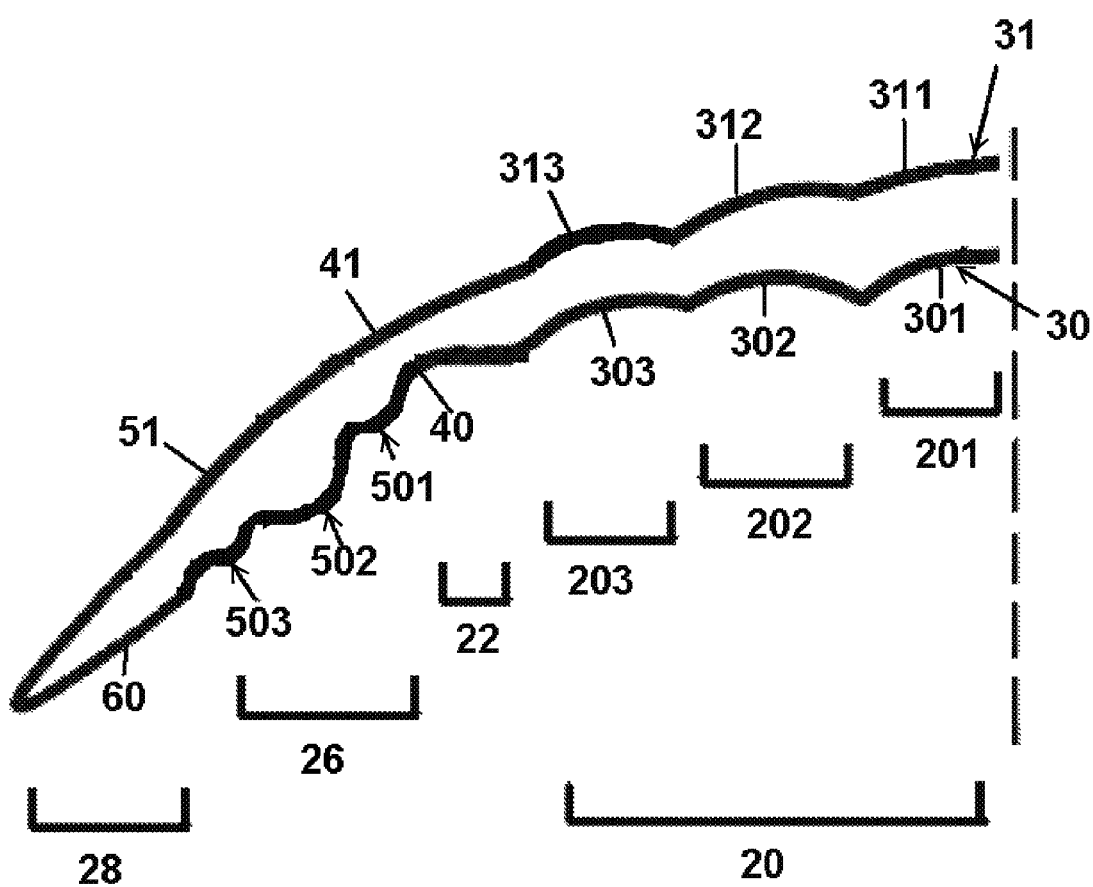
FIG. 4B is a partial sectional view of yet another ortho-k soft contact lens for myopia reduction.

Although the alignment zone 26 can be formed with a single alignment curve 50, its front and/or back surfaces can also be divided into multiple zones 501, 502, and 503, as shown in FIGS. 2B and 4B, for the same reasons as aforementioned in order to smooth out the connection to adjacent zones, i.e. the pressure control zone 22 and the peripheral zone 28. Alternatively, the alignment zone 26 and its multiple division zones can also be smoothed out by certain e value for the back alignment curve 50 or front alignment curve 51. The aspheric curvatures can also merge, radially inwardly, with an aspheric pressure control zone 22 or radially outwardly with the peripheral zone 28 to form a single aspheric curvature with plurality of e values. The alignment zone 26 thus preferably performs dual functions, matching the sagittal height of the contact lens 10 to the peripheral portion of the cornea 12 where it rests, as well as exerting a positive or negative pressure force for ametropia reduction.

The alignment zone 26 can also be utilized to apply the required pressure force for myopia ortho-k and help to bunch up a midperipheral steeper ring on cornea 12 underneath the pressure control zone 22. For alignment zone 26 to exert positive pressure on cornea 12 for myopia ortho-k, the curvature is set to be thicker in thickness than the adjacent pressure control zone 22, such that the pressure control zone 22 will be exerting a negative force on corresponding surface areas of the cornea 12. A back alignment curve 50 steeper than pressure control curve 40, or a front alignment curve 51 flatter than front pressure control curve 41, can be utilized to achieve a thicker axial thickness for the alignment zone 26. As shown in FIG. 4B, alignment zone 26 can also be divided into multiple zones 501, 502, and 503 having front and/or back curvatures of the middle division alignment zone forming or comprising the thickest portion and the consecutive division zones gradually thinning as well as outwardly toward the adjacent zones of pressure control zone 22 and peripheral zone 28.

Alternatively, the alignment zone 26 and its multiple division zones can be smoothed out by a negative e value for the back alignment curve 50 or a positive e value for the front alignment curve 51. The aspheric curvatures 50 and 51 can also merge, radially inwardly, with an aspheric pressure control curve 40 or front pressure control curve 41 respectively, or radially outwardly with the back or front surface of peripheral zone 28 to form a single aspheric curvature with a plurality of e values. It is also possible to blend or merge the junctions with other available curves including but not limited to a convex surface.

The required pressure force for hyperopia ortho-k is a negative force on alignment zone 26 for flattening a midperipheral ring underneath the pressure control zone 22. For alignment zone 26 to help exert such a negative pressure force on a cornea 12 for hyperopia ortho-k, the alignment zone 26 is configured to be thinner in axial thickness than the adjacent pressure control zone 22, such that the pressure control zone 22 will be exerting a positive force on corresponding surface areas of the cornea 12. A back alignment curve 50 can be made flatter than pressure control curve 40, or a front alignment curve 51 can be made steeper than front pressure control curve 41, to achieve a thinner axial thickness for the alignment zone 26. As shown in FIG. 2B, the alignment zone 26 can also be divided into multiple zones 501, 502, and 503, and the front and/or back curvatures of the middle division alignment zone can be set to form or comprise the thinnest portion and the consecutive division zones gradually thickening inwardly as well as outwardly toward the adjacent zone of pressure control zone 22 and peripheral zone 28.

Alternatively, the alignment zone 26 and its multiple division zones can be smoothed out by a positive e value for the back alignment curve 50 or a negative e value for the front alignment curve 51. The aspheric curvatures 50 and 51 can also merge, radially inwardly, with an aspheric pressure control curve 40 or front pressure control curve 41 respectively, or radially outwardly with the back or front surface of peripheral zone 28 to form a single aspheric curvature with a plurality of e values. It is also possible to blend or merge the junctions with other available curves including but not limited to a convex surface.

The sagittal height or AEL (axial edge lift) of an alignment curve 50 is determined by mean K (also known as KM): (Vertical KM+Horizontal KM)/2. The central mean K in turn will be recalculated to estimate the mid-peripheral radius of curvature according to the eccentricity (e-value) of a cornea to match the point that the alignment zone 26 contacts the cornea 12. Corneal eccentricity is a measure of peripheral corneal flattening, with zero denoting a spherical shape and 1.00 denoting a parabolic shape. The average cornea has an eccentricity of approximately e=0.5.

This calculation method enjoys two benefits over known methods. First, this calculation method can be used for both toric (astigmatic) and non-toric corneas. Corneas with the same horizontal central KM should not necessarily be fitted with the same ortho-k lens. The vertical curvature could be different (astigmatic or toric cornea), the e-value could also be different, and they should be considered as different corneas. Second, by considering the e-value of a normal cornea, the peripheral attachment of the alignment zone 26 can be improved.

In one embodiment, the zone width of the alignment zone 26 ranges from 1.0 mm to 7.0 mm (depending on the fitting characteristics desired and the particular shape factors of the cornea 12), the radius of curvature for the alignment curve 50 and the front alignment curve 51 is 1-20 diopters steeper or flatter than the rear pressure control curve 40 and front pressure control curve 41, and the thickness drop between the alignment zone 26 and pressure control zone 22 is about 0.03 mm to 1 mm thicker or thinner depending on the extent and kind of ametropia to be treated.

Peripheral Zone 28

A peripheral zone 28 located peripherally outward from the alignment zone 26 is also preferably included in the present soft contact lens 10. The peripheral zone 28 is designed with a radius of curvature, for peripheral base curve 60, longer than that of the cornea 12, yielding a curvature much less (flatter) than an estimated curvature of a portion of the cornea 12 corresponding to the alignment zone 26. The peripheral zone 28 has its back surface contour defined by a predefined peripheral curve 60, which is preferably nearly parallel to the sclera shell out of the limbus.

A peripheral zone 28 of the contact lens 10 is designed to be wide enough to carry the major zones of the reshaping lens, the optical zone 20, pressure control zone 22 and alignment zone 26, for resting on sclera and is preferably 1 to 2 mm larger than the cornea size for extending 1-2 mm out of limbus for stabilization and centration of the present lens. The overall diameter of the contact lens 10 is preferably usually between 12.5 mm-16 mm. In one embodiment, the width of the peripheral zone 28 ranges from 1 mm to 6.0 mm, and the radius of curvature for the peripheral curve 60 is 0-15 diopters longer (flatter) than the base curve 30.

The peripheral curve 60 of the peripheral zone 28 is preferably set to be flatter than the estimated curvature of a portion of the cornea 12 corresponding to the alignment zone 26, and peripheral zone 28 preferably has an outer annular portion of the zone that extends outward 1-2 mm beyond the limbus to rest on the sclera shell, of which the curvature is much flatter than the curvature of the cornea 12.

The peripheral zone 28 also preferably comprises an edge lift to promote tear flow under the contact lens 10 by taking advantage of a tear pumping action created when the individual blinks the eyelid. This tear flow allows constant lubrication and oxygenation of the lens-cornea interface and results in a more comfortable and wearable lens 10. Additionally, the edge lift preferably allows easy contact lens removal from the cornea 12.

Methods of Treatment

In order to treat ametropia with the present lenses, a subject is first examined by a practitioner in order to determine the type and degree of ametropia experienced by the subject's eye(s). The different radii used to define the base curve 30, the pressure control curve 40, the alignment curve 50 and the peripheral curve 60 and their relative thicknesses are calculated after examination of a patient's eyes and the associated ocular tissues. The corneal curvature for each eye is measured and the proper contact lens power defined. An individual skilled in the examination techniques of the ocular system is capable of performing these tasks.

A soft contact lens having at least an optical zone, a pressure control zone, and an alignment zone as described above is then prepared for each eye of the subject which is determined to be in need thereof. The rear, generally concave surface of each lens, i.e. the surface comprising the base curves of the lens, is then placed on the cornea of the appropriate eye of the subject and worn for a period of time in order to produce the desired therapeutic effect.

The present contact lenses can be worn by a subject according to schedules known to those of skill in the art of orthokeratology in order to achieve vision improvement and/or corneal reshaping. Typically, contact lenses are worn during the night in orthokeratology regimens, although daywear is also possible. The present lenses are particularly advantageous for daywear, since they are more comfortable than the rigid contact lenses traditionally used to perform orthokeratology.

In order to correct corneal curvature, the present lenses are preferably worn by a subject for at least 14 days, more preferably for at least 21 days, and even more preferably for one to two months. In order to correct corneal curvature, the lenses should be worn for at least six hours per day, more preferably for 8-12 hours per day. Once a desired corneal curvature is achieved, either the present lenses or traditional hard contact lenses can be worn on a regular schedule, such as during the night every other day, in order to maintain the desired corneal curvature, as recommended by a practitioner skilled in orthokeratology.

EXAMPLES

Example 1

Treatment of Myopia

Contact lenses as described herein were provided to a patient having a HVID (cornea size) of 11.4 mm (both right and left eyes). The lenses had the following dimensions:

Right Eye (OD):
KM: 43.125 D (7.83 mm) @H, 44.625 D (7.56 mm) @V (lens KM code: 43.50)
Refraction: −2.00 (lens power-code for myopia −2.00 D)
Lens size (Lens diameter): 13.6 mm
Lens Material Contaflex C38 (water content 38%)
refraction index: dry status 1.51; hydrated 1.4375
expansion factor: 1.1941
Optical zone/base curve: width 6.13 mm, radius 8.54 mm, e value 1.36
Front optical curve: radius 8.85 mm, e value −0.67
C.T.: 0.16 mm
Pressure control zone: width 0.54 mm, radius of curvature 7.79 mm
Alignment zone: width 1.50 mm, radius of curvature 7.93 mm, e value 0.4
Peripheral zone: width 1.70 mm, radius of curvature 9.43 mm
Thickness drop between optical zone and pressure control zone: 0.06 mm
Thickness drop between pressure control zone & alignment zone: 0.119 mm Left Eye (OS):
KM: 43.375 D (7.78 mm) @H, 44.625 D (7.56 mm) @V; (KM code: 43.50)
Refraction: −2.50 (myopia −2.50 D); (power-code for myopia −2.50 D)
Lens size (Lens diameter): 13.6 mm
Lens Material Contaflex C38 (water content 38%)
refraction index: dry status 1.51; hydrated 1.4375
expansion factor: 1.1941
Optical zone/base curve:
width: 6.13 mm; Radius 8.77 mm; e value: 1.62
Front optical curve: radius 9.15 mm, e value −0.78
C.T.: 0.16 mm
Pressure control zone: width 0.54 mm, radius of curvature 7.44 mm
Alignment zone: width 1.50 mm, radius of curvature 7.93 mm, e value 0.4
Peripheral zone: width 1.70 mm, radius of curvature 9.43 mm
Thickness drop between optical zone and pressure control zone: 0.072 mm
Thickness drop between pressure control zone & alignment zone: 0.143 mm The lenses were designed using a sagittal height estimation for the cornea and corresponding lens zone thickness as follows:

(1) cornea sagittal height for 43.50 D original cornea (6.0 mm zone & e=0.4): 0.596 mm
(2) sagittal height for flattened cornea (6.0 mm zone & e=0.4)
   OD (41.50 D cornea after −2.00 D reduction): 0.567 mm
   OS (41.00 D cornea after −2.50 D reduction): 0.560 mm.
(3) estimated corneal sagittal height difference=(1)−(2)
   OD 0.029 mm
   OS 0.036 mm
(4) The drop between optical zone and pressure control zone
   OD: 0.060 mm
   OS: 0.072 mm
   Both are twice the amount of cornea sagittal height difference
(5) The drop between pressure control zone and alignment zone
   OD 0.119 mm
   OS 0.143 mm
   Both are 3 times the amount of cornea sagittal height difference The contact lenses were worn by the patient for 14 days, 7-8 hours per day. After this correction period, the patient experienced a myopia reduction to zero power. This is equivalent to a myopia reduction of 2.00 D and 2.50 D for OD and OS, respectively.

Although the present invention has been discussed in considerable detail with reference to certain preferred embodiments, other embodiments are possible. The steps disclosed for the present methods are not intended to be limiting nor are they intended to indicate that each step is necessarily essential to the method, but instead are exemplary steps only. Therefore, the scope of the appended claims should not be limited to the description of preferred embodiments contained in this disclosure. All references cited herein are incorporated by reference in their entirety.

What is claimed is:

1. A soft contact lens for treating ametropia comprising the following circumferential zones:
    an optical zone in the center of the lens having a back curvature defined by a first optical base curve, a front curvature defined by a first optical front curve, a minimum axial thickness, and a maximum axial thickness, wherein the maximum axial thickness of the optical zone is at the center of the optical zone and the thickness of the optical zone decreases toward an outer edge of the optical zone;
    a pressure control zone extending radially outwardly from the optical zone, the pressure control zone having a back curvature defined by a pressure control base curve, a front curvature defined by pressure control front curve, a minimum axial thickness, and a maximum axial thickness, wherein the minimal axial thickness of the pressure control zone is in a radially central portion of the pressure control zone and the axial thickness of the pressure control zone increases radially from the central portion of the pressure control zone toward the optical zone and toward the peripheral zone; and
    an alignment zone extending radially outwardly from the pressure control zone, the alignment zone having a back curvature defined by alignment base curve, a front curvature defined by alignment front curve, a minimum axial thickness, and a maximum axial thickness, wherein the maximum axial thickness of the alignment zone is in a radially central portion of the alignment zone and the axial thickness of the alignment zone decreases from the central portion of the alignment zone toward the pressure control zone,
    wherein the minimum axial thickness of the pressure control zone is less than the minimum axial thickness of the optical zone and the minimum axial thickness of the alignment zone, and,
    wherein the optical zone and the pressure control zone have a thickness drop of between 0.03 mm and 1 mm, and the pressure control zone and the alignment zone have a thickness drop of between 0.03 mm and 1 mm, and
    wherein the contact lens is pliable and is made from a material containing between 20% and 70% water.

2. The soft contact lens of claim 1, wherein the minimum axial thickness of the pressure control zone is less than the minimum axial thickness of the optical zone by an amount which is equal to or greater than a predetermined decrease in sagittal height of a subject's cornea.

3. The soft contact lens of claim 2, wherein the minimum axial thickness of the pressure control zone is less than the minimum axial thickness of the optical zone by an amount which is between 10% and 200% greater than a predetermined decrease in sagittal height of a subject's cornea.

4. The soft contact lens of claim 1, wherein the minimum axial thickness of the pressure control zone is less than the minimum axial thickness of the alignment zone by an amount which is equal to or greater than a predetermined decrease in sagittal height of a subject's cornea.

5. The soft contact lens of claim 4, wherein the minimum axial thickness of the pressure control zone is less than the minimum axial thickness of the alignment zone by an amount which is between 10% and 200% greater than a predetermined decrease in sagittal height of a subject's cornea.

6. The soft contact lens of 1, wherein the optical zone comprises two or more division optical zones, and wherein the minimum axial thickness of the pressure control zone is thinner than the minimum axial thickness of each of the division optical zones.

7. The soft contact lens of claim 6, comprising a first division optical zone adjacent the pressure control zone and a second division optical zone located radially inwardly of the first division optical zone, wherein the radius of curvature of the base curve of the second division optical zone is shorter than the radius of curvature of the base curve of the first division optical zone, or wherein the radius of curvature of the front optical curve of the second division optical zone is longer than the radius of curvature of the front optical curve of the first division optical zone, such that the division optical zones become thinner radially outwardly.

8. The soft contact lens of claim 7, wherein the back curvatures of the first division optical zone and the second division optical zone are merged and have one or more positive e-values, or the front curvatures of the first division optical zone and the second division optical zone are merged and have one or more negative e-values, thereby forming a waning optical zone having an aspheric back curvature or an aspheric front curvature, such that the waning optical zone becomes thinner radially outwardly.

9. The soft contact lens of claim 8, wherein the back curvature of the waning optical zone and the back curvature of the pressure control zone are merged and have a positive e-value, or the front curvature of the waning optical zone and the front curvature of the pressure control zone are merged and have a negative e-value, thereby forming a waning optical-pressure control zone having an aspheric back curvature or an aspheric front curvature, such that the waning optical-pressure control zone becomes thinner radially outwardly.

10. The soft contact lens of claim 9, wherein the back curvatures of the waning optical-pressure control zone and the back curvature of the alignment zone are merged with one or more positive e-values and then with one or more negative e-values radially outwardly, or the front curvatures of the waning optical-pressure control zone and the alignment zone are merged with one more negative e-values and then with one or more positive e-values radially outwardly, thereby forming a waning then waxing optical-pressure control-alignment zone having an aspheric back curvature or aspheric front curvature, such that the optical-pressure control-alignment zone becomes thinner and then thicker radially outwardly.

11. The soft contact lens of claim 1, wherein the alignment zone comprises two or more division alignment zones, and wherein the minimum axial thickness of the pressure control zone is thinner than the minimum axial thickness of each of the division alignment zones.

12. The soft contact lens of claim 11, comprising a first division alignment zone and a second division alignment zone located radially outward of the first division alignment zone, wherein the back curvature of the second division alignment zone is steeper than the back curvature of the first division alignment zone, or the front curvature of the second division alignment zone is flatter than the front curvature of the first division alignment zone, such that the division alignment zones become thicker radially outwardly.

13. The soft contact lens of claim 12, wherein the back curvatures of the first division alignment zone and the second division alignment zone are merged and have a negative e-value, or the front curvature the first division alignment zone and the second division alignment zones are merged and have a positive e-value, thereby forming a waxing alignment zone having an aspheric back curvature or an aspheric front curvature, such that the waxing alignment zone becomes thicker radially outwardly.

14. The soft contact lens of claim 1, further comprising a peripheral zone coupled to the alignment zone and extending radially outwardly from the alignment zone.

15. A method of treating ametropia, comprising the steps of:
  (a) providing a soft contact lens for treating ametropia having a rear surface and the following circumferential zones:
    an optical zone in the center of the lens having a back curvature defined by a first optical base curve, a front curvature defined by a first optical front curve, a minimum axial thickness, and a maximum axial thickness, wherein the maximum axial thickness of the optical zone is at the center of the optical zone and the thickness of the optical zone decreases toward an outer edge of the optical zone;
    a pressure control zone extending radially outwardly from the optical zone, the pressure control zone having a back curvature defined by a pressure control base curve, a front curvature defined by pressure control front curve, a minimum axial thickness, and a maximum axial thickness, wherein the minimal axial thickness of the pressure control zone is in a radially central portion of the pressure control zone and the axial thickness of the pressure control zone increases radially from the central portion of the pressure control zone toward the optical zone and toward the peripheral zone; and
    an alignment zone extending radially outwardly from the pressure control zone, the alignment zone having a back curvature defined by alignment base curve, a front curvature defined by alignment front curve, a minimum axial thickness, and a maximum axial thickness, wherein the maximum axial thickness of the alignment zone is in a radially central portion of the alignment zone and the axial thickness of the alignment zone decreases from the central portion of the alignment zone toward the pressure control zone,
  wherein the minimum axial thickness of the pressure control zone is less than the minimum axial thickness of the optical zone and the minimum axial thickness of the alignment zone,
  wherein the optical zone and the pressure control zone have a thickness drop of between 0.03 mm and 1 mm, and the pressure control zone and the alignment zone have a thickness drop of between 0.03 mm and 1 mm, and
  wherein the contact lens is pliable and is made from a material containing between 20% and 70% water;
  (b) contacting the rear surface of the soft contact lens with the cornea of an eye of a subject; and
  (c) wearing the soft contact lens for a predetermined period of time.

16. The method of claim 15, wherein the ametropia being treated is myopia.

* * * * *